Patented Apr. 3, 1923.

1,450,174

UNITED STATES PATENT OFFICE.

ALBERT GRANICHSTADTEN AND EMIL SITTIG, OF VIENNA, AUSTRIA.

NICKELIFEROUS CATALYZERS AND PROCESS OF MANUFACTURING THE SAME.

No Drawing.     Application filed August 12, 1921.   Serial No. 491,840.

*To all whom it may concern:*

Be it known that we, ALBERT GRANICHSTADTEN and EMIL SITTIG, both citizens of the Republic of Austria, residing at Vienna, Austria, have invented certain new and useful Improvements in Nickeliferous Catalyzers and Processes of Manufacturing the Same (for which we have filed applications in Austria on July 7, 1917; Sweden, June 14, 1920; and Norway, June 12, 1920), of which the following is a specification.

Our invention relates to nickeliferous catalyzers, more particularly those used for hydrogenating oils, and it has for its object to provide an improved catalyzer, which not only is very efficient as a catalyzer, but also acts as an excellent bleaching agent for the product of hydrogenation, so that the oil treated is simultaneously hydrogenated and the hydrogenated oil is strongly bleached, even if the raw oil is as dark coloured as for instance the third pressing of sesame oil, or the second pressing of olive oil or maize oil, and the hydrogenation is continued only until the product has a melting point of 36 to 42 degrees centigrade, as required for the manufacture of fats for food purposes. A further object of our invention is to provide a simple and reliable process for manufacturing this improved catalyzer.

Nickeliferous catalyzers as heretofore used for hydrogenating purposes and more particularly for hydrogenating oils and fats have consisted of metallic nickel or nickel oxides or nickel salts such as the borate, carbonate, formate or silicate of nickel. In many cases, more particularly when metallic nickel was used as the catalytic agent, such catalytic agent was deposited or precipitated by various methods on an inert carrier, which acted as a supporting or base substance, such as kieselguhr, pumice stone or the like, for increasing the active surface of the catalytic agent. It has also been proposed to produce nickeliferous catalyzers for hydrogenating oil by precipitating an aqueous solution of a nickel salt with an alkaline silicate (water glass) without any further additions (U. S. Patent Nr. 1143332); or by precipitating a mixture of aqueous solutions of nickel sulphate and aluminum sulphate and of a protective colloid with water glass (U. S. Patent Nr. 1172062) or by precipitating mixtures of aqueous solutions of nickel salts and salts of earth alkalies with sodium carbonate and water glass (Austrian Patent Nr. 73543 and more particularly example 12 therein described). In all cases the precipitation was followed by washing, drying, powdering and heating the precipitate in a current of hydrogen. As is stated in the above publications all of these processes furnished catalyzers consisting of metallic nickel, possibly mixed with oxides of nickel, deposited in a state of very fine subdivision on an inert carrier. Careful research has shown that these statements of the above publications, relating to the nature of the catalyzers produced by the prior processes above referred to, are not accurate. Most of the catalyzers thus obtained are markedly pyrophorous and the major part of their entire contents of nickel is soluble in dilute sulphuric acid, the equivalent quantity of hydrogen being evolved. In the case of the process disclosed in the U. S. Patent Nr. 1172062 it was found that owing to the employment of protective colloids, constituting the essential feature of the process there described, the nickel and the aluminum (both presumably in the form of silicates) cannot be precipitated simultaneously, but that the precipitation is fractional, that is to say first almost pure aluminum silicate is precipitated and then almost pure nickel silicate.

The hydrogenating results obtained by these catalyzers heretofore used are objectionable in several respects. In the first place the high temperatures required in carrying into practice the hydrogenation on a commercial scale by means of these known catalyzers and the long duration of the hydrogenating process—which as described in the literature on this subject may be from 2 to 3 hours at temperatures of even more than 200 degrees centigrade—cause great losses of hydrogen by leakage. In addition a complicated spraying apparatus must be made use of in practically all cases, which requires careful and skilled labor in spite of which the apparatus frequently gets out of order, whereby interruptions of work and hence reduction of capacity of the plant are caused, and moreover the large quantity of hydrogen expended in operating the spraying apparatus must be compressed for utilizing it again and this requires a good deal of work. Owing to the high temperature (up to more than 200 degrees centigrade) to which the oil is exposed for so long a period, the colour and the taste of the product become such that it cannot be directly used for the manufacture of fat for food purposes; the hydrogenated oil must be thoroughly deodorized by the action of steam and bleached, if products of good quality are desired. These two indispensable operations are not, however, successful in all cases, and always require a good deal of time and expense.

Now we have discovered that by an improved process a catalyzer, more particularly for oil hydrogenating purposes, may be obtained, whereby oil may be hydrogenated to the desired degree in 15 to 20 minutes, and that oils which readily hydrogenate can have their treatment completed even in a shorter time, as low as 6 minutes, and at temperatures as low as 120 to 160 degrees centigrade. Decomposition, discolouring and disagreeable taste or smell are entirely avoided, and no complicated apparatus, more particularly no spraying apparatus, is required. On the contrary by means of this improved catalyzer the oil is very well bleached simultaneously with the hydrogenation thereof, and at the same time it loses any disagreeable taste and smell, even if the raw oil has a dark colour and objectionable taste and smell as the third pressing of sesame oil or second pressing olive oil or maize oil. Thus our improved catalyzer enables us to secure simultaneously with the hydrogenation a bleaching and an improvement of the taste and smell of the hydrogenated product, which will satisfy the most rigorous legal and commercial requirements. At the same time, owing to the rapidity of hydrogenation and the reduction of loss of hydrogen by leakage resulting therefrom, and further owing to the simplicity of the apparatus used, which is not liable to get out of order, the cost of hydrogenation with our improved catalyzer is greatly decreased, but also the production of hydrogenated oils most suitable for food purposes is greatly accelerated and thereby the capacity of existing hydrogenating plants is greatly increased. Moreover, and this is a most important advantage of our improved catalyzer, oils may be utilized for manufacturing fats for food purposes which up to now could not be so utilized.

Our process for producing our improved nickeliferous catalyzer consists in precipitating a mixture of the aqueous solutions of a salt of magnesium, and a salt of nickel, with an aqueous solution of water glass or alkali silicate, but without the addition of any other salt or a protective or auxiliary colloid and in then washing the precipitate, cautiously drying it at a temperature not exceeding 100 degrees centigrade, very finely grinding it, and then heating it in a hydrogen current to a temperature of 300 to 500 degrees centigrade and finally permitting it to cool in hydrogen.

The following is an example of carrying into practice our improved process.

An aqueous solution of a nickel salt, for instance nickel chloride ($NiCl_2$) is mixed with an aqueous solution of a magnesium salt for instance magnesium chloride ($MgCl_2$) but without the addition of other salts or of protective colloids. The proportion of these constituents may be chosen at will, depending on the nature of the oil to be treated. In practice it has been found that by taking 1 to 3 molecules of $MgCl_2$ to 1 molecule of $NiCl_2$ very good results are obtained. To this mixture we then add so much of an aqueous solution of water glass of 38° Bé. at a temperature not exceeding 60° centigrade, that all of the nickel and the magnesium is precipitated in the form of a colloidal compound (as hydrogel). The very voluminous precipitate is carefully washed and then dried at a temperature not exceeding 100° centigrade and ground as finely as possible, whereby an extremely fine, light and loose powder of a pale green colour is obtained. This powder is then heated to a temperature of from 300 to 500° centigrade in a current of hydrogen and then permitted to cool in hydrogen; by this heating, known per se and commonly called "activating", the powder undergoes a change of colour into dark grey. It undergoes the same change of colour when heated in carbonic dioxide, but then it is entirely inactive. It is to be noted, that while in the process disclosed in the U. S. Patent Nr. 1172062 the nickel and the aluminum salts are not precipitated simultaneously on adding the water glass solution, but fractionally, first the aluminum salt and then the nickel salt as above stated. In our process, as above described, the nickel salt and the magnesium salt are precipitated simultaneously and entirely. Further it is to be noted, that the catalyzer obtained by our process above described is non-pyrophorous and, when heated with dilute (10%) sulphuric acid, only a comparatively small proportion of its total nickel contents (about 1/16 to 1/12 thereof) is dissolved evolving hydrogen, whereas the remainder, that is to say by far the major part of the nickel of our improved catalyzer, is not present in the free metallic state, not evolving hydrogen with sulphuric acid. On the contrary, most of the catalyzers, produced by the prior methods above referred to, are found to be pyrophorous and to give off the major part of their total nickel contents when treated with sulphuric acid as above set forth, an equivalent quantity of hydrogen being evolved. From these facts, established beyond doubt by careful experiments, it follows, that the catalyzers produced by the old methods above referred to mainly consist of metallic nickel mixed with nickel oxides on an inert carrier, as is set forth in the specifications above referred to. A small portion of the nickel may be present in the form of nickel silicate. On the other hand in our process both the nickel and the magnesium are simultaneously precipitated in the form of colloidal silicates and from the well known fact that silicates formed simultaneously and more particularly colloidal silicates most readily combine with each other to form double silicates or (in the case of colloids) adsorption compounds, and from the further fact that in our improved catalyzer obtained as above described only a small fraction of its entire nickel contents is present in the form of metallic nickel, it must be concluded that our catalyzer consists mainly of a double silicate of nickel and magnesium, the term double silicate also including adsorption compounds of nickel silicate and magnesium silicate. This radical difference between the chemical composition of the known catalyzers and of our improved catalyzer not only accounts for the difference in chemical and physical behaviour above set forth, but becomes also manifest in the behaviour of our improved catalyzer in the hydrogenating process to be presently described.

The dark grey powder obtained as above described and constituting our improved catalyzer is ready for use, but care must be taken to prevent it from coming into contact with air; therefore it is preferably directly discharged from the cooling chamber into a suitable quantity of the oil to be treated and intimately mixed therewith.

After the oil to be hydrogenated has been carefully freed from any acid and put into a suitable vessel provided with an appropriate agitating apparatus and heating and cooling means such as steam and cold water coils, the catalyzer is introduced into the same, the vessel is tightly closed and any air is displaced therefrom by hydrogen, the charge of oil is heated to a suitable temperature of from 120 to 160° centigrade and hydrogen under an absolute pressure of about 3 to 4 kilogrammes to the square centimetre is caused to enter into the vessel and the agitating apparatus is operated, all of this procedure being well known in the art. The beginning of the hydrogenating action is clearly indicated by a decrease of the pressure and an increase of temperature in the vessel, whereupon the supply of the hydrogen and of heat may be so controlled as to keep the pressure and the temperature at the desired points, until the oil under treatment has been hydrogenated to the desired extent, that is to say has combined with the desired quantity of hydrogen. For obtaining a hydrogenated oil of a melting temperature of from 36 to 42° centigrade usually 10 to 20 minutes are required for the reaction if to ten thousand parts by weight of the oil a quantity of the catalyzer has been added which contains ten to thirty-five parts by weight of nickel. These numbers are taken from a long series of experiments with sesame oil, cotton oil, olive oil, poppy seed oil, rape oil, linseed oil, fish oils and others; but the most advantageous quantity of the catalyzer, the hydrogenating temperature and duration largely vary with the nature and quality of the oil to be treated and are preferably determined by preliminary experiments for each particular case.

After proper cooling, the hydrogenated oil is tapped off and it will be found that the hydrogenated oil is very well bleached and free from any disagreeable smell and taste even if the raw oil, after having been freed from acid had dark colour and a disagreeable smell and taste such as the third pressing of sesame oil or raw rape or colza oil. Other oils yield pure white fats after hydrogenation. If the hydrogenation has been properly carried out, the hydrogenation product does not require any further bleaching and only slight deodorization with steam (for removing the well known metallic taste) even if products of the best quality have to be manufactured therefrom.

It is to be noted that with this improved catalyzer, which at the same time acts as a most efficient bleaching agent, it is sufficient to keep the vessel filled with hydrogen under the desired absolute pressure, usually not less than 2 to 3 kilogrammes per square centimetre, and that no spraying is required as in the hydrogenating apparatus now in use, for instance that of Nordmann or Wilbuschewitsch. No hydrogen is blown through the oil during hydrogenation, except so much as may flow therethrough automatically to compensate for any losses by leakage. For these reasons the hydrogenating plant is not liable to get out of order. This and the rapidity of hydrogenation and the perfect bleaching secure the advantages above referred to.

We claim:

1. A process for manufacturing a nickeliferous catalyzer which consists in preparing a mixture of an aqueous solution of a nickel salt and of a magnesium salt, adding thereto an aqueous solution of water glass, whereby both the nickel and the magnesium are precipitated simultaneously in the form of a colloidal double silicate and in then washing, drying and grinding the precipitate and heating it in a current of hydrogen and permitting it to cool in hydrogen.

2. A process for manufacturing a nickeliferous catalyzer which consists in mixing aqueous solutions of nickel chloride and magnesium chloride, adding thereto an aqueous solution of water glass, whereby both the nickel and the magnesium are precipitated simultaneously in the form of a colloidal double silicate, and in then washing, drying and grinding the precipitate and heating it in a current of hydrogen to a temperature of from 300 to 500° centigrade and permitting it to cool in hydrogen.

3. A catalyzer for hydrogenation purposes which is adapted to bleach the hydrogenation product containing an activated double silicate of nickel and magnesium substantially free from metallic nickel.

4. A catalyzer for hydrogenation purposes which is adapted to bleach the hydrogenation product containing an activated double silicate of nickel and magnesium substantially free from metallic nickel and intimately mixed with oil.

In testimony whereof we have signed our names to this specification.

Ing. ALBERT GRANICHSTADTEN.
Dr. EMIL SITTIG.